United States Patent [19]

Takei

[11] 3,949,919
[45] Apr. 13, 1976

[54] SELF-ALIGNING CAPSTAN BEARING
[75] Inventor: Yoshiyuki Takei, Iwaki, Japan
[73] Assignee: Alps Motorola, Inc., Tokyo, Japan
[22] Filed: Oct. 18, 1974
[21] Appl. No.: 516,027

[30] Foreign Application Priority Data
Oct. 23, 1973  Japan.............................. 48-119185

[52] U.S. Cl. .................. 226/194; 74/206; 242/206; 308/29; 308/72; 308/140
[51] Int. Cl.² .................. B65H 17/20; F16C 23/04; F16C 23/08; F16C 35/12
[58] Field of Search ......... 308/15, 23, 72, 139, 140, 308/141, 142, 144, 22, 29; 74/206, 207; 226/190, 194; 242/206; 274/39 A

[56] References Cited
UNITED STATES PATENTS

| 44,000 | 8/1864 | Klinkerman .................... 308/141 X |
| 399,037 | 3/1889 | Haddock......................... 308/140 X |
| 3,232,681 | 2/1966 | Mittmann et al. ................ 308/72 X |
| 3,770,177 | 11/1973 | Dattilo................................ 226/194 |
| 3,820,861 | 6/1974 | Strang................................... 308/72 |
| 3,854,646 | 12/1974 | Dorfel et al..................... 226/194 X |

Primary Examiner—Albert J. Makay
Assistant Examiner—Howard Beltran
Attorney, Agent, or Firm—James W. Gillman; Donald J. Lisa

[57] ABSTRACT

A cartridge tape player adapted to receive a cartridge having a capstan shaft for driving the tape in the cartridge and a tape player chassis including a pair of bilateral symmetrical retainers mounted to the tape player chassis. Each of the retainers includes parallel extensions which form spherical sockets having an inner spherical concave surface. A pair of ball bearings having outer convex surfaces are positioned around the capstan shaft to expose the capstan shaft to the tape in the cartridge and each of the ball bearings are positioned in the spherical sockets of the retainers thereby engaging the outer convex surface of the bearings with the inner spherical concave surface to provide a self-aligning bearing structure for mounting the capstan shaft within the tape player chassis.

7 Claims, 6 Drawing Figures

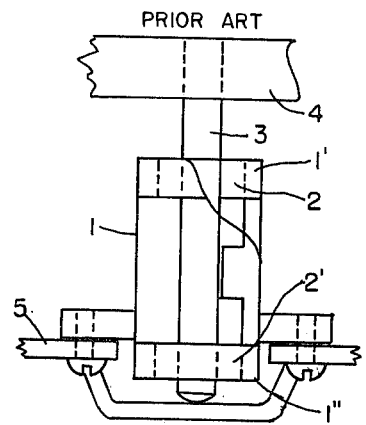
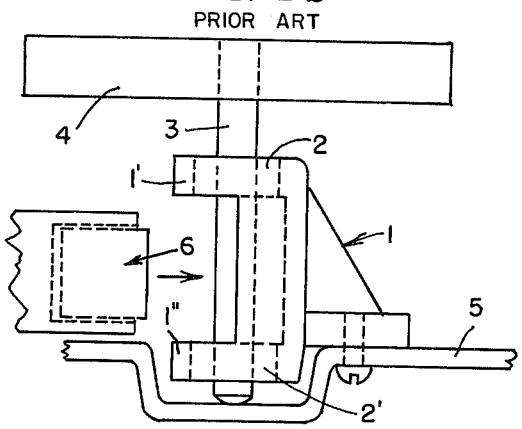
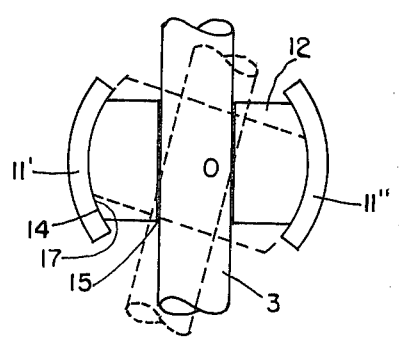
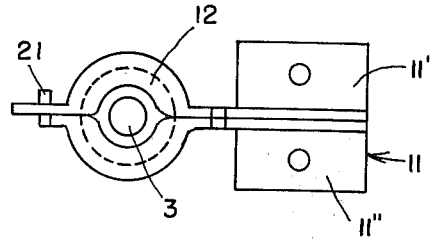
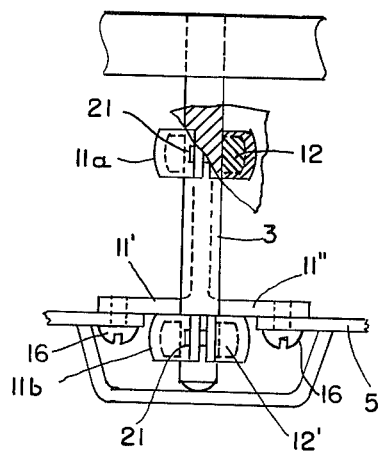
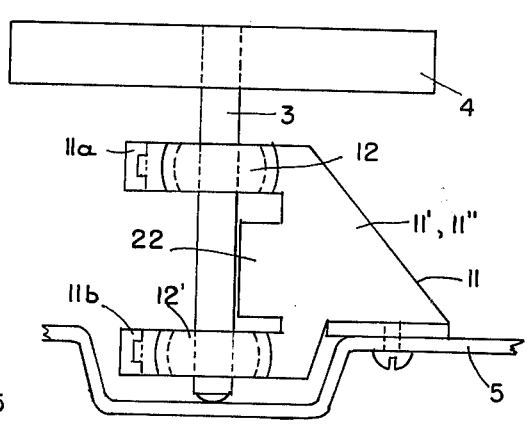

SELF-ALIGNING CAPSTAN BEARING

BACKGROUND OF THE INVENTION

This invention relates generally to bearing devices for cartridge type magnetic tape recorders, and more particularly to a bearing mounting apparatus for supporting the capstan shaft.

In the past, bearing mounting apparatus for supporting the capstan shaft within cartridge-type magnetic tape recorders have been constructed as shown in FIGS. 1(a) and 1(b), wherein a bearing supporting member 1, made of zinc die-cast and subjected to precision machining, is fixedly mounted to the chassis 5 of the magnetic tape recorder. Bearings 2 and 2', each having a central hole and constructed from an oil impregnated metal, are then positioned in portions 1' and 1" of the bearing supporting member 1 from the upper and lower sides of the member 1, respectfully, such that the central holes of the bearings 2 and 2' are substantially aligned with respect to shaft 3 which supports a flywheel 4. In order to achieve smooth rotation of the capstan shaft 3 within bearings 2 and 2', a further center-aligning step is required for adjusting the tolerances in the bearings. In FIG. 1(b) a cartridge 6 is inserted in the magnetic tape recorder and depressed toward the capstan shaft 3 in the direction marked by the arrow to be engaged by the capstan shaft 3 for driving the tape in the cartridge.

In the above-described construction of the bearing mounting apparatus for receiving the capstan shaft in accordance with the prior art, the bearings 2 and 2' are forced into the bearing holding portions 1a and 1b of the bearing supporting member 1 in such a manner that the forces necessary to so position them frequently deforms the close tolerances required in such mounting apparatus. Furthermore, the additional center-aligning step required for correcting the tolerances between the capstan shaft and inner surfaces of the openings in the bearings 2 and 2' is difficult and results in a player construction that is costly to manufacture.

SUMMARY OF THE INVENTION

Accordingly, one object of the present invention is to provide a bearing mounting apparatus for a capstan shaft which is simple in construction and economical in manufacture.

Another object of the present invention is to provide a bearing mounting apparatus for a capstan shaft which can be readily aligned with the capstan shaft without requiring precision machining and additional center-aligning steps.

Briefly, these and other objects of the present invention are achieved by a bearing mounting device for the capstan shaft in a cartridge-type tape recorder, the device having a pair of bearings each having an outer peripheral convex surface formed into a spherical configuration and means for supporting the bearings in such a manner that each of said bearings can be rotated relative to the supporting means, to thereby facilitate the alignment of the bearings and the capstan shaft.

The above-mentioned supporting means is comprised of a pair of bilateral symmetrical retainers each having parallel extensions which form spherical sockets having an inner spherical concave surface configuration. Each of the bearings is positioned and held between said inner spherical concave surfaces of said two pieces to provide a self-aligning bearing structure for mounting the capstan shaft within the tape player chassis.

The nature, principle, and utility of the present invention will be better understood from the following detailed description of the invention when read in conjunction with the accompanying drawings wherein like parts are designated by like reference numerals.

BRIEF DESCRIPTION OF THE DRAWINGS

FIG. 1(a) is a front elevational view in cross section of a conventional bearing mounting for a capstan shaft;

FIG. 1(b) is a side elevational view in cross section of the conventional bearing mounting of FIG. 1(a);

FIG. 2 is an enlarged elevational view in cross section of the bearing mounting device in accordance with the present invention;

FIG. 3 is a top plan view of the bearing mounting device in accordance with the present invention;

FIG. 4(a) is a front elevational view of the embodiment shown in FIG. 3 in accordance with the present invention, and FIG. 4(b) is a side elevational view of the embodiment shown in FIG. 3 in accordance with the present invention.

DETAILED DESCRIPTION

Referring now to the drawings, in FIGS. 2 through 4, there is illustrated the preferred embodiment of the present invention wherein a bearing supporting device 11 includes a pair of bilateral symmetrical retainers or bearing supports 11' and 11", respectively. Each of the bearing supports 11' and 11" is provided with two parallel bearing support extensions or portions 11a and 11b for supporting bearings 12 and 12', respectively, as will hereinafter be described.

FIG. 2 is an enlarged view in cross section illustrating the bearing 12 supported by the corresponding one of the bearing support extensions 11a (not shown). A central opening 13 is provided through the bearing 12 which opening 13 is adapted to receive the capstan shaft 3. The outer concave peripheral surface 14 of each of the bearings is formed into a spherical configuration having its center axis 0 located on the central axis of the bearing 12. The outer concave spherical surfaces 14 of the bearings 12 and 12' are held between the two supporting halves 11' and 11" at the extensions 11a and 11b, respectively. Thus, each of the parallel support extensions form a spherical socket having an inner concave surface 17 (FIG. 2) thereon which cooperates with the concave surface 14 on the bearings to provide a self-aligning bearing structure. Accordingly, each of the bearings 12 and 12a can be displaced around its center axis 0 as indicated by broken line 15 in FIG. 2.

In assembling the bearing mounting device in accordance with the present invention, the bearing supporting halves 11' and 11" are first held together such that the bearings 12 and 12' are supported therebetween. The bearing supporting device 11 thus assembled is then fixedly mounted to the chassis 5 by screws 16 and the bearing supporting halves 11' and 11" are clamped or held together so that the bearings 12 and 12' are not rotated by the rotation of the capstan shaft 3 but can be moved around their own centers as indicated by broken line 15 in FIG. 2. To accomplish such a result a projection 21 (FIG. 3) may be provided on one of the bearing supporting halves 11" and an opening (not shown) engageable with the projection 21 may be provided through the other of the bearing supporting halves 11' for facilitating the assembling work.

Because the bearing mounting device supports the bearings 12 and 12' in such a manner that the center lines thereof are self-aligned by simply inserting the capstan shaft 3 through the openings 13 of the bearings, the degree of precision required in machining the bearing supporting device is greatly reduced in comparison with prior art bearing mounting devices. Furthermore, the bearing device is simple in construction and economical in manufacture. The bearing device of the present invention has an additional advantageous feature in that its mechanical strength, because of the depression of the cartridge applied to the bearing supporting device, is in a direction perpendicular to the thickness of the device.

A forwardly extended portion 22 integral to the bearing supporting device 11 as shown in FIG. 4(b) is provided for preventing the magnetic tape from being wound around the capstan shaft when the tape becomes bunched up or slack. The portion 22 extends outwardly from the support device 11 such that there is a small clearance between the capstan shaft 3 and portion 22. Although the provision of the extended portion 22 is not limitative in the invention, this may be provided when it is required and can effectively prevent the deleterious winding of the magnetic tape around the capstan shaft.

It is apparent from the forgoing disclosure that the bearing mounting assembly of the present invention results in a tape player device that is lighter in weight than the prior art devices because of the elimination of die cast capstan housing and results in a self-aligning bearing structure that is absent in the prior art devices.

I claim:

1. A bearing mounting assembly for use in a cartridge-type tape player device having a tape player chassis, including in combination:
    a capstan shaft having spaced first and second capstan bearings for driving the tape in the cartridge
    said first and second capstan bearings each having an outer convex surface thereon, each of said first and second bearings receiving said capstan shaft for exposing said shaft to the tape in the cartridge, and
    bearing support means mounted to the chassis and having a pair of parallel extensions thereon, each of said extensions receiving and holding one of said first and said second capstan bearings to provide a self-aligning bearing structure for mounting said capstan shaft within the player chassis to hold said shaft in operative relationship with respect to the tape in the cartridge.

2. The assembly according to claim 1 wherein said bearing support means is a pair of bilateral symmetrical elements mounted to the chassis, each of said elements having parallel extensions thereon which provide spherical sockets having inner spherical concave surfaces thereon, each of said first and second capstan bearings being supported and held by said spherical sockets to provide a self-aligning bearing structure for mounting said capstan shaft within the player chassis.

3. The assembly according to claim 2 wherein said bearing support means further includes means for preventing the tape in the cartridge from wrapping around said capstan shaft with the tape becoming bunched or slack.

4. The assembly according to claim 3 wherein said means for preventing the tape from wrapping around said capstan shaft includes a portion integral with said bilateral symmetrical elements and extending to said capstan shaft such that there is a small clearance between said capstan shaft and said symmetrical elements.

5. The assembly according to claim 2 wherein one of said pair of bilateral symmetrical elements includes a projection thereon and the other of said pair of bilateral symmetrical elements is adapted to receive said projection to thereby hold said symmetrical elements together to provide a selfaligning bearing structure for mounting said capstan shaft with the player chassis.

6. In a cartridge tape player adapted to receive a tape cartridge and having a capstan shaft for driving the tape in the cartridge and a tape player chassis, the combination including:
    a pair of ball bearings each having an outer convex surface thereon, said bearings receiving the capstan shaft to hold the same in operative relationship with respect to the tape in the cartridge; and
    bearing support means mounted to the tape player chassis receiving said pair of bearings and engaging said outer convex surfaces thereon to provide a self-aligning bearing structure for mounting the capstan shaft within the player chassis to hold the shaft in operative relationship with respect to the tape in the cartridge.

7. The tape player according to claim 6 wherein said bearing support means is a pair of bilateral symmetrical retainers mounted to the tape player chassis, each retainer having parallel extensions thereon, said extensions forming spherical sockets having inner spherical concave surfaces thereon, each of said spherical sockets adapted for receiving one of said bearings and for engaging said outer spherical surface of said bearings to provide a self-aligning bearing structure for mounting the capstan shaft within the player chassis.

* * * * *